July 4, 1950            H. BALCH            2,513,837
WILD ANIMAL TRAP
Filed Dec. 26, 1944            4 Sheets-Sheet 2
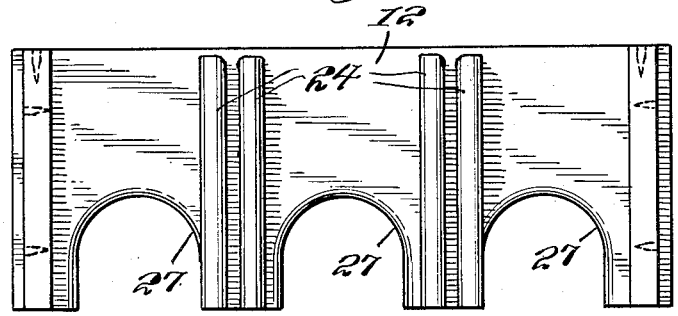
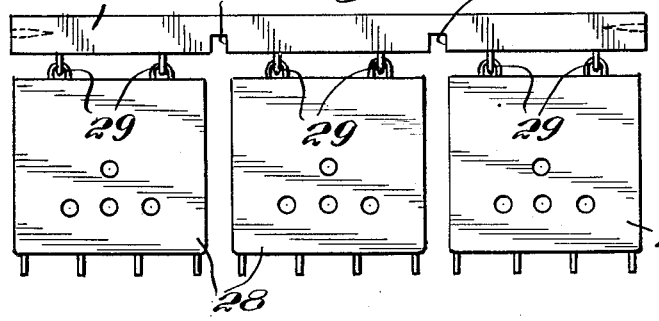
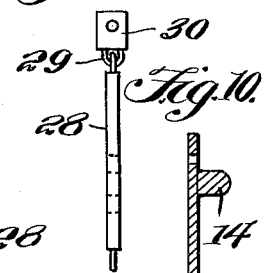
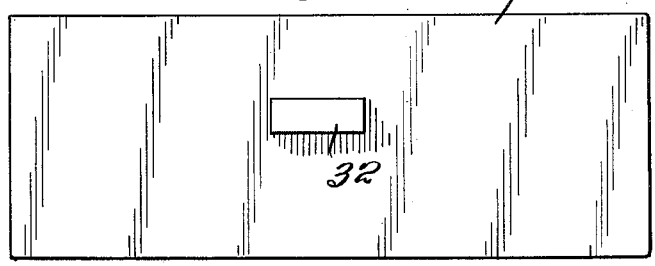
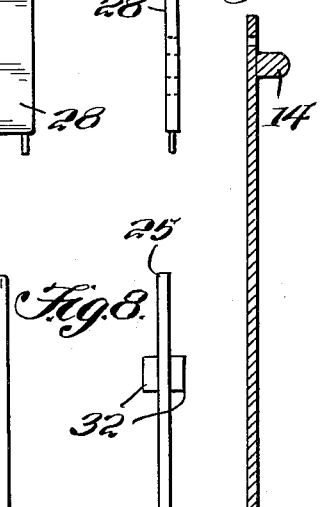
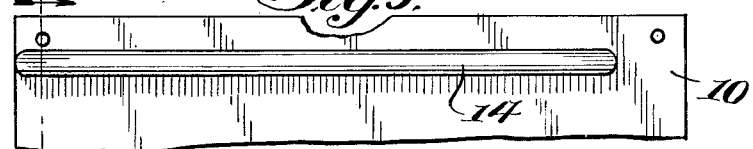
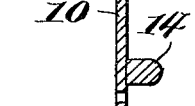
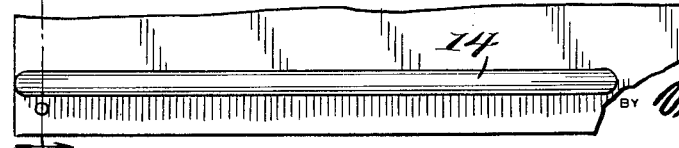
INVENTOR.
Harry Balch,
BY Victor J. Evans & Co.
ATTORNEYS July 4, 1950 — H. BALCH — 2,513,837
WILD ANIMAL TRAP
Filed Dec. 26, 1944 — 4 Sheets-Sheet 3
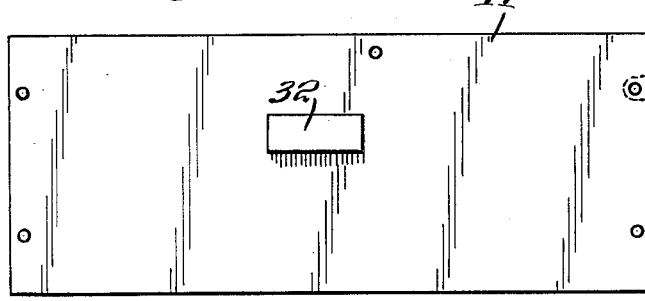
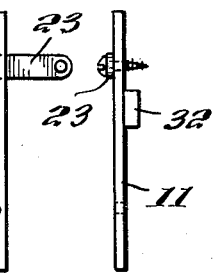
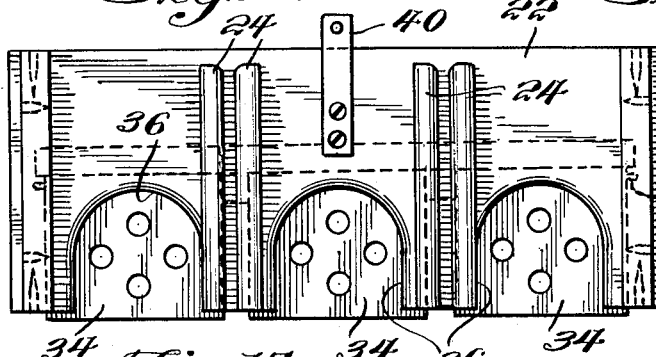
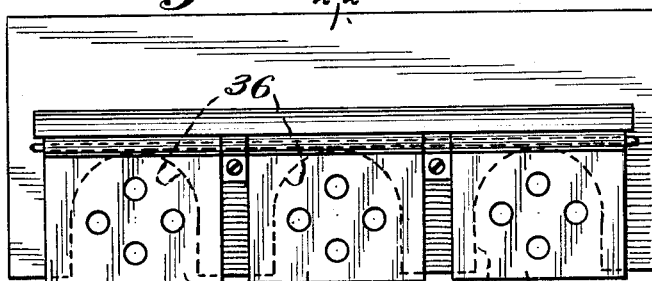
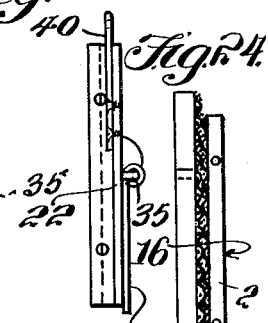
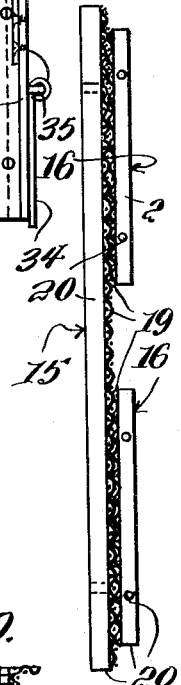
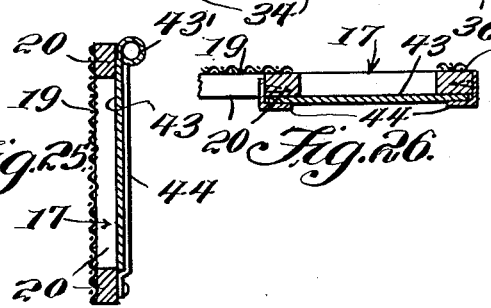
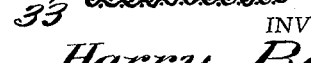
INVENTOR.
Harry Balch,
BY Victor J. Evans & Co.
ATTORNEYS July 4, 1950  H. BALCH  2,513,837
WILD ANIMAL TRAP
Filed Dec. 26, 1944  4 Sheets-Sheet 4

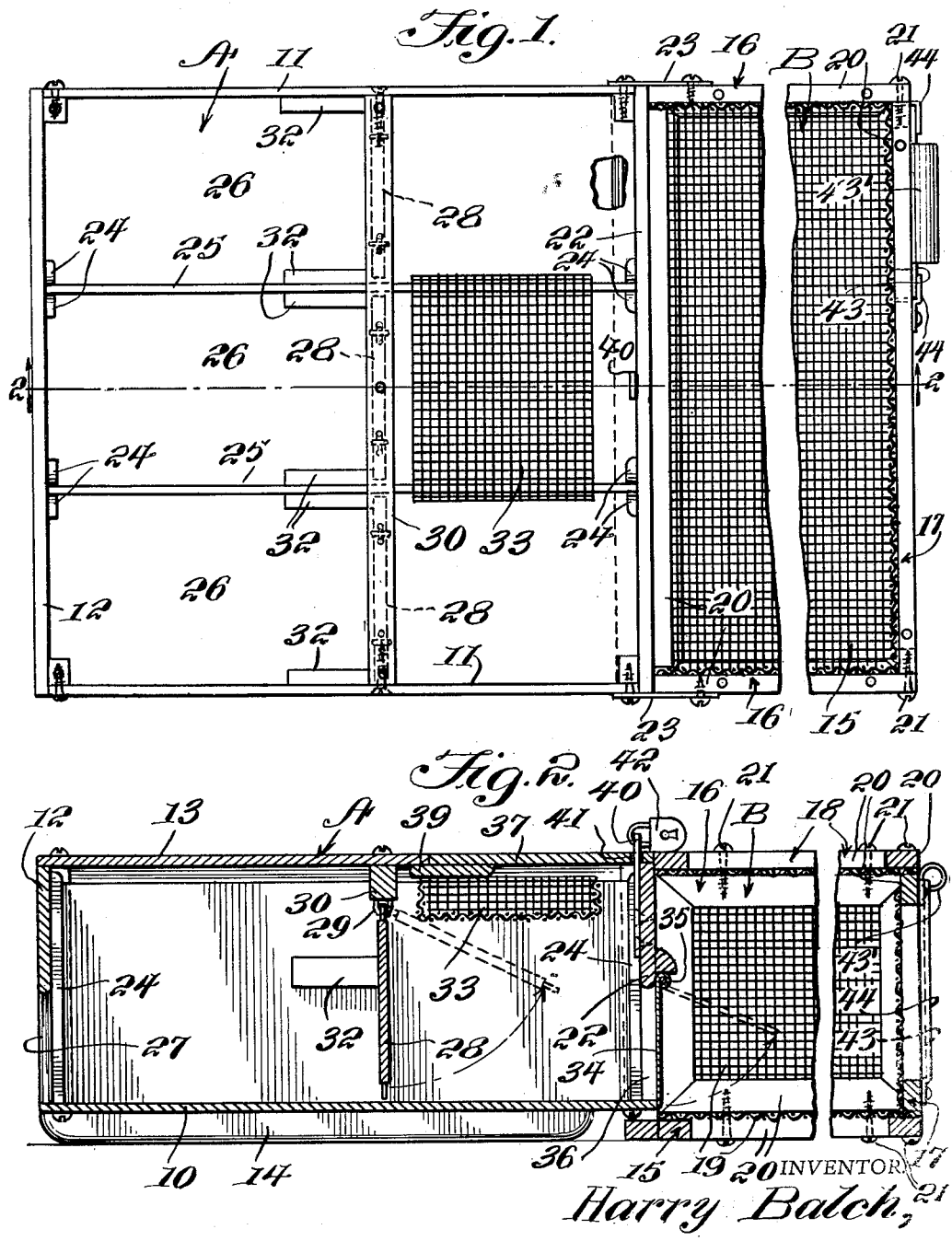

INVENTOR.
Harry Balch,
BY Victor J. Evans & Co.
ATTORNEYS

Patented July 4, 1950

2,513,837

UNITED STATES PATENT OFFICE 2,513,837

WILD ANIMAL TRAP

Harry Balch, Baltimore, Md.; H. Ross Black, Jr., and A. Jerome Diener administrators of said Harry Balch, deceased Application December 26, 1944, Serial No. 569,783

1 Claim. (Cl. 43—65)

The invention relates to a trap, and more especially to wild animal traps.

The primary object of the invention is the provision of a trap of this character, wherein any number of wild animals can be decoyed and trapped thereby, without injury to the same, and eliminating all chances of an escape, the animals being caged alive and free from a maimed condition, the trap being of novel construction, and unique in the working thereof, in that the cage section is detachable from the trapping section, without chances of freeing the animals during separation of such sections.

Another object of the invention is the provision of a trap of this character, wherein a number of catches can be had, as the said trap does not require re-setting after a single catch, and thus requiring little or no attention on the part of an attendant, while the baiting for the trap is confined so that an animal entering the latter cannot obtain the bait, and this at all times during the entrapment.

A further object of the invention is the provision of a trap of this character, wherein a series of trapping areas are provided therein, and these communicating with a single cage for entrapment of the animals caught.

A still further object of the invention is the provision of a trap of this character, which is simple in construction, thoroughly reliable and efficient in operation, strong, durable, automatic in the working thereof, readily portable, thoroughly sanitary, readily and easily cleaned, and inexpensive to manufacture.

With these and other objects in view, the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings:

Figure 1 is a top plan view of the trap constructed in accordance with the invention, with its top removed.

Figure 2 is a sectional view taken on the line 2—2 of Figure 1 looking in the direction of the arrows, the top being in place.

Figure 3 is an inner face view of the front entrance wall of the trap and detached.

Figure 4 is an end edge view thereof.

Figure 5 is an elevation of the trapping doors and hanger therefor.

Figure 6 is an edge elevation thereof, looking toward one end.

Figure 7 is a side view of a removable partition or dividing wall for the trap.

Figure 8 is an end edge view thereof.

Figure 9 is an exploded plan view of the bottom of the trap looking toward its outer face.

Figure 10 is a sectional view taken on the line 10—10 of Figure 9 looking in the direction of the arrows.

Figure 11 is an outside face view of one side wall of the trap.

Figure 12 is an end edge view thereof.

Figure 13 is an elevation looking toward one face of the end wall next to the cage.

Figure 14 is an end edge view thereof.

Figure 15 is a view similar to Figure 13 looking toward the other face of such wall.

Figure 20 is a side view of the bait container or holder.

Figures 23 and 24 illustrate the manner in which the bottom and side frames may be relatively arranged.

Figure 25 is a vertical sectional view taken through the sliding door of the end frame of the cage section.

Figure 26 is a horizontal sectional view through such door.

Similar reference characters indicate corresponding parts throughout several views in the drawings.

Figure 16:
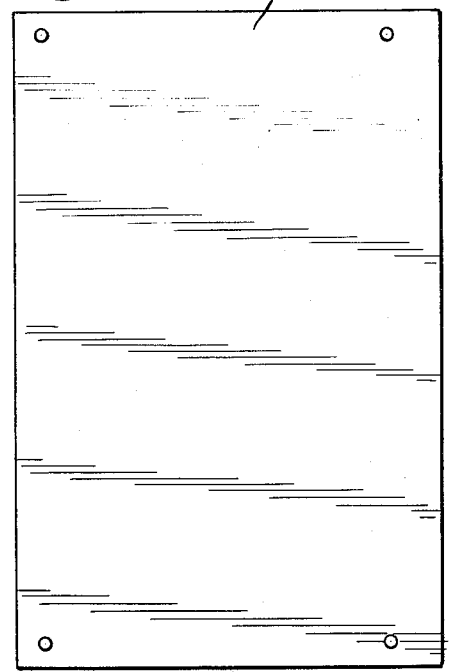
Figure 16 is a plan view of the top of the trap.
Figures 17, 18:
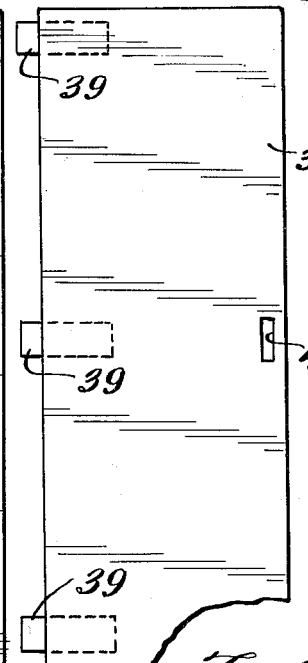
Figure 17 is a plan view of the removable closure in association with the top.
Figure 18 is an end edge view of the top.
Figure 19:
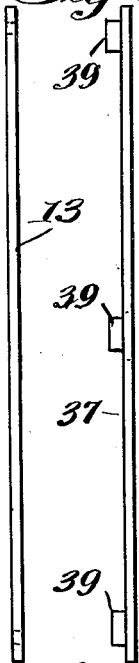
Figure 19 is a side edge view of the closure.

Referring to the drawings in detail, the trap constituting the present invention comprises a trapping section denoted generally at A, and a cage section denoted generally at B, respectively. The trapping section includes a box-like body having a bottom 10, opposite side walls 11, an entrance outer end wall 12, and a top 13, respectively. The bottom 10 carries rest rails 14, which are spaced apart and are longitudinally disposed thereon.

The section B includes a bottom frame 15, side frames 16, an outer end frame 17, and a top frame 18, respectively. These frames are covered with reticulated or wire mesh fabric panels 19 and are secured at the meeting rails 20 thereof, which latter are secured together by fasteners 21. Between the sections A and B is arranged a parting wall 22, which confronts the inner open ends of such sections which are disposed in abutting relation to one another, and are connected together by external metal straps 23, these being located uppermost thereon.

Arranged on the inner faces of the outer end wall 12 and this parting wall 22 are spaced vertical cleats 24, forming runways for a series of longitudinally disposed, spaced, vertically set partitions 25, dividing the interior of the section A into inlet passageways 26 from entrance doorways 27 provided in the outer end wall 12.

Midway of the passageways 26 are suspended swinging trap doors 28, which are hinged at 29 to a hanger bar 30 disposed crosswise of the section A and having notches 31 for the removable interfitting with the partitions 25, the doors 28 being normally closed against stops 32, yet are free to swing away from the same for the trapping of animals in the inner portions of the passageways 26, when the said doors are nosed by such animals for the opening thereof. Hung upon the partitions 25 is a reticulated bait basket or holder 33 for luring the animals into the section A through the doorways 27.

The parting wall 22 on its face confronting the inner open end of the section B has connected thereto the perforated doors 34, by hinge connections 35 for closing doorways 36 provided in said wall 22, and in this manner the animals passing therethrough into the section B will be trapped in the latter, these doors 34 being adapted to swing vertically inwardly of the section B for the opening of the doorways 36, so that animals passing therethrough will be automatically trapped in said section.

Fitting a clearance in the top 13 of the section A is a removable hatch door or closure 37 which is held in place by a cleat 39 and a fixed hasp 40, respectively, the latter being worn by the wall 22 for protrusion through a slot 41 for the attachment of a lock 42 which fastens the door or closure 37 in a closed condition.

The panel 19 on the outer end frame 17 is provided with a sliding gate 43 closing an opening therein so that access can be had to the section B through this opening on the moving of the gate to an open position, the gate 43 being provided with a hand grip 43' exteriorly thereof, and such gate engages guide strips 44 fastened in place in any suitable manner.

Figure 21:
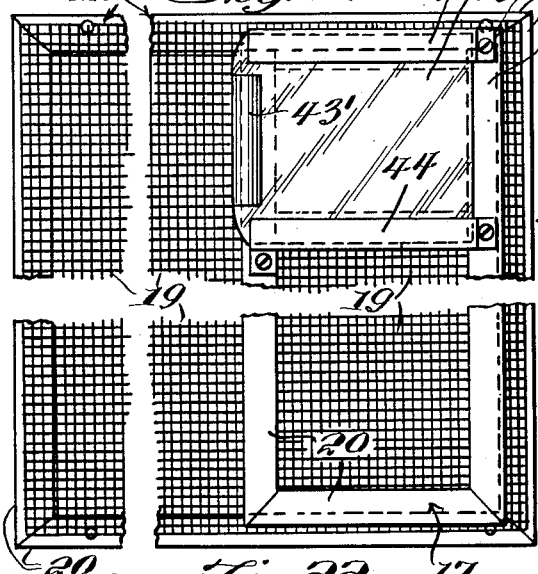
Figures 21 and 22 illustrate the manner in which the end and top frames of the cage section may be arranged relatively when said section is to be knocked down for storage or shipment.
Figure 23:
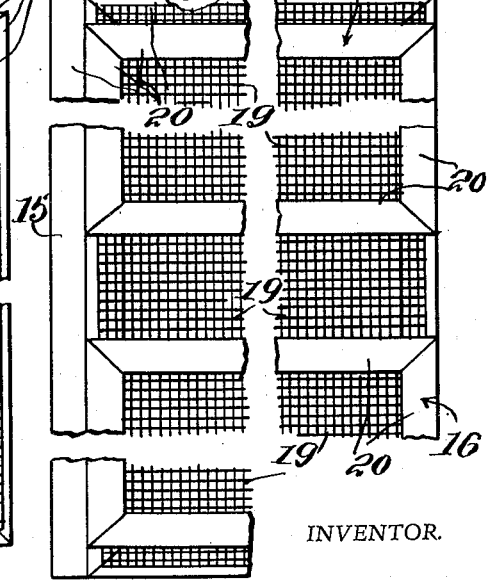
Figure 22:

In Figures 21 and 22 of the drawings, there is shown the manner in which the end frame 17 and top frame 18 may be relatively arranged, and Figures 23 and 24 show how the bottom frame 15 and side frame 16 may be arranged, when the cage section B is to be knocked down for storage or shipment. The units of Figure 21 may be placed on those shown in Figure 23.

What is claimed is:

In a trap, the combination of bottom wall, side walls extending upwardly therefrom, an outer wall secured to said bottom and side walls, a parting wall substantially parallel to said outer wall and secured to said bottom and side walls, a top secured to said outer, side and parting walls, said outer wall having a plurality of spaced entrance openings, said parting wall having spaced exit openings aligned with said entrance openings, respectively, opposed guiding means on said outer and parting walls, said guiding means being located between adjacent openings, removable spaced partitions extending substantially parallel to said side walls and supported by said guiding means whereby a plurality of passageways are formed, each said passageway extending from an entrance to an exit opening, a hanger member extending transversely of said partitions, swingable trap doors in said passageways, means swingingly supporting said trap doors from said hanger, stop means on said side walls and partitions for limiting the swinging motion of said trap doors toward said parting wall, a cage section, means detachably connecting the same against said parting wall, doors over said exit openings and hingedly connected on said parting wall, said doors opening into said cage section, whereby decoyed animals entering through said entrance openings pass through said passageways into the cage section, said doors impeding retrograde movement of the animal.

HARRY BALCH.

REFERENCES CITED

The following references are of record in the file of this patent:

UNITED STATES PATENTS

| Number | Name | Date |
| --- | --- | --- |
| 224,960 | Simpson | Feb. 24, 1880 |
| 1,367,416 | Meszaros | Feb. 1, 1921 |
| 1,528,270 | Schuckman | Mar. 3, 1925 |